(12) United States Patent
Qin et al.

(10) Patent No.: US 8,233,379 B2
(45) Date of Patent: Jul. 31, 2012

(54) METHOD, NETWORK ELEMENT DEVICE AND NETWORK SYSTEM FOR ESTABLISHING CONNECTION BETWEEN MAINTENANCE NODE AND BASE STATION

(75) Inventors: Zhongyu Qin, Shenzhen (CN); Gang Qian, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 340 days.

(21) Appl. No.: 12/685,817

(22) Filed: Jan. 12, 2010

(65) Prior Publication Data
US 2010/0110885 A1    May 6, 2010

Related U.S. Application Data

(63) Continuation of application No. PCT/CN2008/073390, filed on Dec. 9, 2008.

(30) Foreign Application Priority Data

Dec. 14, 2007 (CN) .......................... 2007 1 0199577

(51) Int. Cl.
*H04L 12/26* (2006.01)
(52) U.S. Cl. ....................................................... 370/216
(58) Field of Classification Search .......... 370/216–228, 370/254, 310, 328, 329, 351, 389, 401, 431, 370/437, 464, 465
See application file for complete search history.

(56) References Cited

U.S. PATENT DOCUMENTS

| | | | |
|---|---|---|---|
| 6,487,591 B1 | 11/2002 | Budhraja et al. | |
| 6,591,150 B1* | 7/2003 | Shirota | 700/82 |
| 6,768,726 B2* | 7/2004 | Dorenbosch et al. | 370/331 |
| 6,810,010 B1 | 10/2004 | Matsukawa | |
| 7,420,951 B1* | 9/2008 | Mizell et al. | 370/338 |
| 2003/0137933 A1 | 7/2003 | Yamada et al. | |
| 2004/0268175 A1 | 12/2004 | Koch et al. | |
| 2005/0144316 A1 | 6/2005 | Loo et al. | |

FOREIGN PATENT DOCUMENTS

| | | |
|---|---|---|
| CN | 1791241 A | 6/2006 |
| CN | 1791241 A | 6/2006 |
| CN | 101026798 A | 8/2007 |
| CN | 101047601 A | 10/2007 |
| CN | 101047601 A | 10/2007 |

(Continued)

OTHER PUBLICATIONS

European Office Action, European Application No. 08 861 417.7-2416, Applicant: Huawei Technologies Co., Ltd., Dated: Aug. 18, 2011, 7 pages.

(Continued)

*Primary Examiner* — Dmitry H Levitan
(74) *Attorney, Agent, or Firm* — Slater & Matsil, L.L.P.

(57) ABSTRACT

A method for establishing a connection between a maintenance node and a base station includes the following steps: the base station switches over to a preset standby Operation & Maintenance (OM) channel when an main OM channel fails and sends to the maintenance node via the standby OM channel a notification that the base station has switched over to the standby OM channel; and the maintenance node establishes a connection with the base station over the standby OM channel by using a standby Internet Protocol (IP) address of the base station after receiving the notification. A base station is also provided.

9 Claims, 5 Drawing Sheets

FOREIGN PATENT DOCUMENTS

| WO | WO 01/58043 A2 | 8/2001 |
|---|---|---|
| WO | WO 01/58043 A3 | 8/2001 |
| WO | WO 2006/063519 A1 | 6/2006 |
| WO | WO 2007/115493 A1 | 10/2007 |

OTHER PUBLICATIONS

Chinese Office Action with Partial English Translation, Application No. 200710199577X, Dated Jan. 22, 2010, 8 pages.

English Translation of the Written Opinion of the International Searching Authority, PCT/CN2008/073390, Date of mailing Mar. 5, 2009, 5 pages.

Extended European Search Report, Application No./Patent No. 08861417.7-2416 / 2173124 PCT/CN2008/073390, Dated Jun. 22, 2010, 9 pages.

Written Opinion of the International Searching Authority, PCT/CN2008/073390, Date of mailing Mar. 5, 2009, 5 pages.

First Chinese Office Action, Chinese Application No. 200710199577X, Jan. 22, 2010, 8 pages.

Supplementary European Search Report, Application No. 08861417.7-2416, PCT/CN2008073390, Jun. 22, 2010, 9 pages.

* cited by examiner

METHOD, NETWORK ELEMENT DEVICE AND NETWORK SYSTEM FOR ESTABLISHING CONNECTION BETWEEN MAINTENANCE NODE AND BASE STATION

CROSS-REFERENCE TO RELATED APPLICATIONS

This application is a continuation of International Application No. PCT/CN2008/073390, filed on Dec. 9, 2008, which claims priority to Chinese Patent Application No. 200710199577.X, filed on Dec. 14, 2007, both of which are hereby incorporated by reference in their entireties.

FIELD OF THE INVENTION

The present invention relates to communication technologies, and in particular, to a method, network element device and network system for establishing a connection between a maintenance node and a base station.

BACKGROUND OF THE INVENTION

With the continuous development of the 3rd Generation (3G) technologies, the requirements over the Iub interface bandwidths becomes higher and higher. In Asynchronous Transfer Mode Radio Access Network (ATM RAN) mode, E1 transport is generally adopted, but it is expensive and provides limited bandwidths and therefore does not satisfy the requirements for more bandwidths. Fast Ethernet (FE) access, such as Digital Subscribe Line (DSL) access, is adopted in an Internet Protocol (IP) RAN and provides high bandwidths. Compared with E1 transmission, FE access normally does not guarantee effective Quality of Service (QoS) and does not meet the needs of real-time traffic and high-priority traffic. In view of this, the concept of branch transmission emerges. One branch is ATM over E1 for use in an ATM network; one branch is IP over FE for use in an IP network. Traffic that requires high QoS such as voice and real-time traffic is transported over E1; non-real-time traffic that requires low QoS is carried over FE.

The Iub interface includes three channels: Operation & Maintenance (OM) channel, signaling channel and traffic channel. The OM channel is a maintenance channel between a base station (e.g. Node B) and a maintenance node, and is used by the maintenance node to maintain the base station remotely. However, during research and practice of the prior art, the inventor discovers the following problem:

In an ATM RAN and an IP RAN, there is only one OM channel altogether, so that the maintenance node will be unable to maintain the base station remotely when the OM channel fails.

SUMMARY OF THE INVENTION

Embodiments of the present invention intend to provide a method, network element device and network system for establishing a connection between a maintenance node and a base station so as to guarantee normal exchange of service data between the maintenance node and the base station.

The embodiments of the present invention provide the following technical solution.

A method for establishing a connection between a maintenance node and a base station includes:

by the base station, switching over to a standby OM channel when an main OM channel fails and sending to the maintenance node via the standby OM channel a notification that the base station has switched over to the standby OM channel; and establishing, by the maintenance node, a connection with the base station over the standby OM channel by using a standby IP address of the base station after receiving the notification.

A base station includes:

a switchover unit, adapted to switch over to a standby OM channel when a main OM channel fails;

a notification sending unit, adapted to send to a maintenance node, via the standby OM channel, a notification that the base station has switched over to the standby OM channel; and a connection establishing unit, adapted to establish a connection between the base station and the maintenance node over the standby OM channel by using a standby IP address after the switchover unit switches over to the standby OM channel.

A maintenance node includes:

a notification receiving unit, adapted to receive from a base station a notification that the base station has switched over to a standby OM channel; and a connection establishing unit, adapted to establish a connection with the base station over the standby OM channel by using a standby IP address of the base station after receiving the notification.

A network system includes a base station and a maintenance node, where:

the base station is adapted to: switch over to a standby OM channel when a main OM channel fails, and send to the maintenance node via the standby OM channel a notification that the base station has switched over to the standby OM channel; and the maintenance node is adapted to establish a connection with the base station over the standby OM channel by using a standby IP address of the base station after receiving the notification.

In the embodiments of the present invention, if the main OM channel fails, the base station switches over to the standby OM channel and then the maintenance node establishes a connection with the base station over the standby OM channel by using the standby IP address of the base station, so that the maintenance node and the base station can exchange service data via the standby OM channel and that the maintenance node can maintain the base station remotely.

DETAILED DESCRIPTION OF THE EMBODIMENTS

Figure 1:
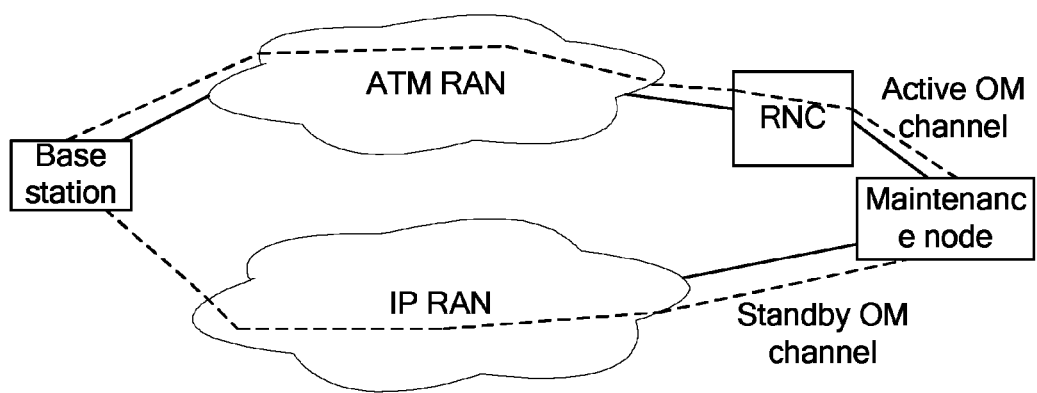
FIG. 1 is a schematic diagram illustrating branch transmission according to an embodiment of the present invention.

As shown in FIG. 1, to overcome the weakness in the prior art, in an embodiment of the present invention, two OM channels are preset in branch transmission. One is an active main OM channel; the other is a standby OM channel. The standby OM channel is activated when the main OM channel fails. Before the standby OM channel is activated, the maintenance node may send User Datagram Protocol (UDP) messages to the base station, but the base station is unable to send messages to the maintenance node via the standby OM channel and unable to exchange service data with the maintenance node via the standby OM channel. Accordingly, the base station has two IP addresses, an active IP address and a standby IP address, respectively corresponding to the main OM channel and the standby OM channel. The standby IP address of the base station is preset in the maintenance node. The two channels are base station→ATM RAN→maintenance node and base station→IP RAN→maintenance node. Either of the two channels may serve as the main OM channel. A remote base station maintenance method provided according to an embodiment of the present invention will be described in detail.

Figure 2:
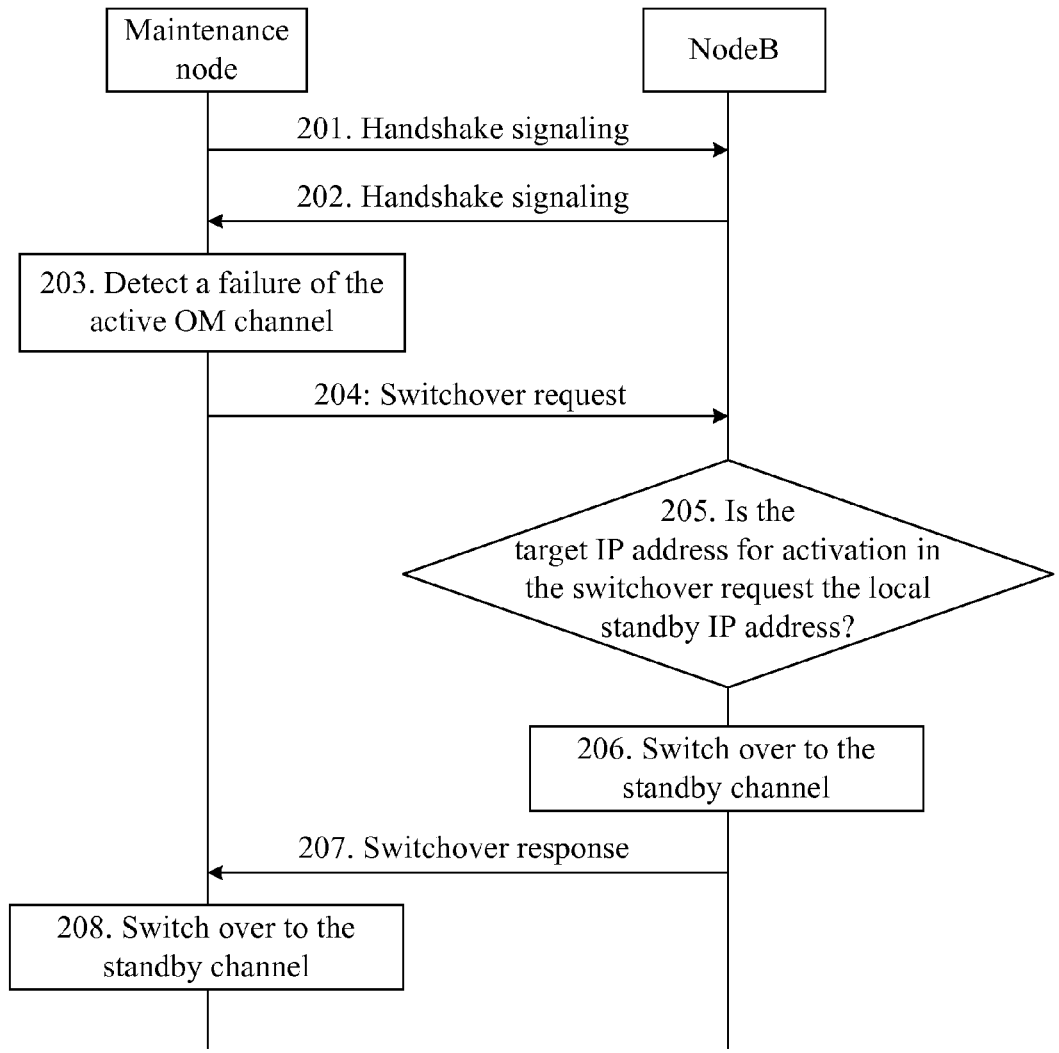
FIG. 2 shows a flowchart of a method for establishing a connection between a maintenance node and a base station according to one first embodiment of the present invention.

FIG. 2 shows a method for establishing a connection between a maintenance node and a base station (e.g. NodeB) in one embodiment of the present invention. The method includes:

Step 201: The maintenance node sends a handshake message to the base station via the main OM channel.

The format of the handshake message in this step is described in Table 1.

TABLE 1

| Field Name | Octets (or bytes) | Meaning |
| --- | --- | --- |
| CmdCode | 2 | Command code |
| Handle | 2 | Command instance |

Step 202: The base station receives the handshake message and sends a handshake response to the maintenance node via the main OM channel.

Before the main OM channel fails, the base station and the maintenance node always exchange signaling via the main channel.

Step 203: The maintenance node checks whether a handshake message is received from the base station within a preset period and if not, determines that the main OM channel fails.

Step 204: The maintenance node sends a switchover request to the base station via the standby OM channel. The switchover request may be carried over UDP.

Because UDP is a connectionless, non-reliable transmission protocol, it is unnecessary for one end to establish a connection with the other end before sending data packets to the other end. Therefore, before the standby OM channel is activated, the maintenance node is able to send the switchover request to the base station over UDP via the standby OM channel.

A structure of the switchover request is described in Table 2.

TABLE 2

| Field Name | Octets | Meaning |
| --- | --- | --- |
| CmdCode | 2 | Command code (may be written as 0x000A) |
| Handle | 2 | Command instance |
| NodeBID | 4 | ID of the base station to switch over to the standby OM channel |
| ActiveNBIP | 20 | Target IP address for activation |

TABLE 2-continued

| Field Name | Octets | Meaning |
| --- | --- | --- |
| ActiveNBIPMASK | 20 | Mask of the target IP address for activation |

Step 205: The base station checks whether the target IP address for activation (i.e. ActiveNBIP) carried in the switchover request is the standby IP address of the base station, in other words, the NodeB determines whether the target IP address for activation is the local standby IP address, and if so, proceeds to step 206 or else ends the procedure.

Step 206: The base station activates the standby IP address and switches over to the standby OM channel.

Step 207: The base station sends a switchover response to the maintenance node via the activated standby OM channel. The switchover response may be carried over UDP.

A structure of the switchover response is described in Table 3.

TABLE 3

| Field Name | Octets | Meaning |
| --- | --- | --- |
| CmdCode | 2 | Command code (may be written as 0x000A) |
| Handle | 2 | Command instance |
| ReturnCode | 4 | 0 indicates switchover can be performed and non-0 values indicate switchover inability, which is detailed in Body |
| NodeBID | 4 | ID of the base station that has switched over to the standby OM channel |
| ActiveNBIP | 20 | Activated standby IP address of the base station |
| ActiveNBIPMASK | 20 | Mask of the activated standby IP address of the base station |
| wLength | 2 | Length of Body |
| Body | | Details about inability of channel switchover |

Step 208: Upon reception of the switchover response, the maintenance node switches over to the standby OM channel and establishes a connection with the base station over the standby OM channel by using the standby IP address of the base station.

This step may be implemented in the following mode: The maintenance node uses the standby IP address of the base station to establish a connection with the base station via a Transmission Control Protocol (TCP) session with the base station over the standby OM channel. Normally, the maintenance node also has an IP address. The maintenance node starts a TCP session with the base station by using the IP address of the maintenance node and the standby IP address of the base station and further establishes a TCP connection with the base station.

After this step, the base station and the maintenance node exchange service data via the activated standby OM channel and exchange handshake messages over the standby OM channel to check whether the activated standby OM channel fails.

Figure 3:
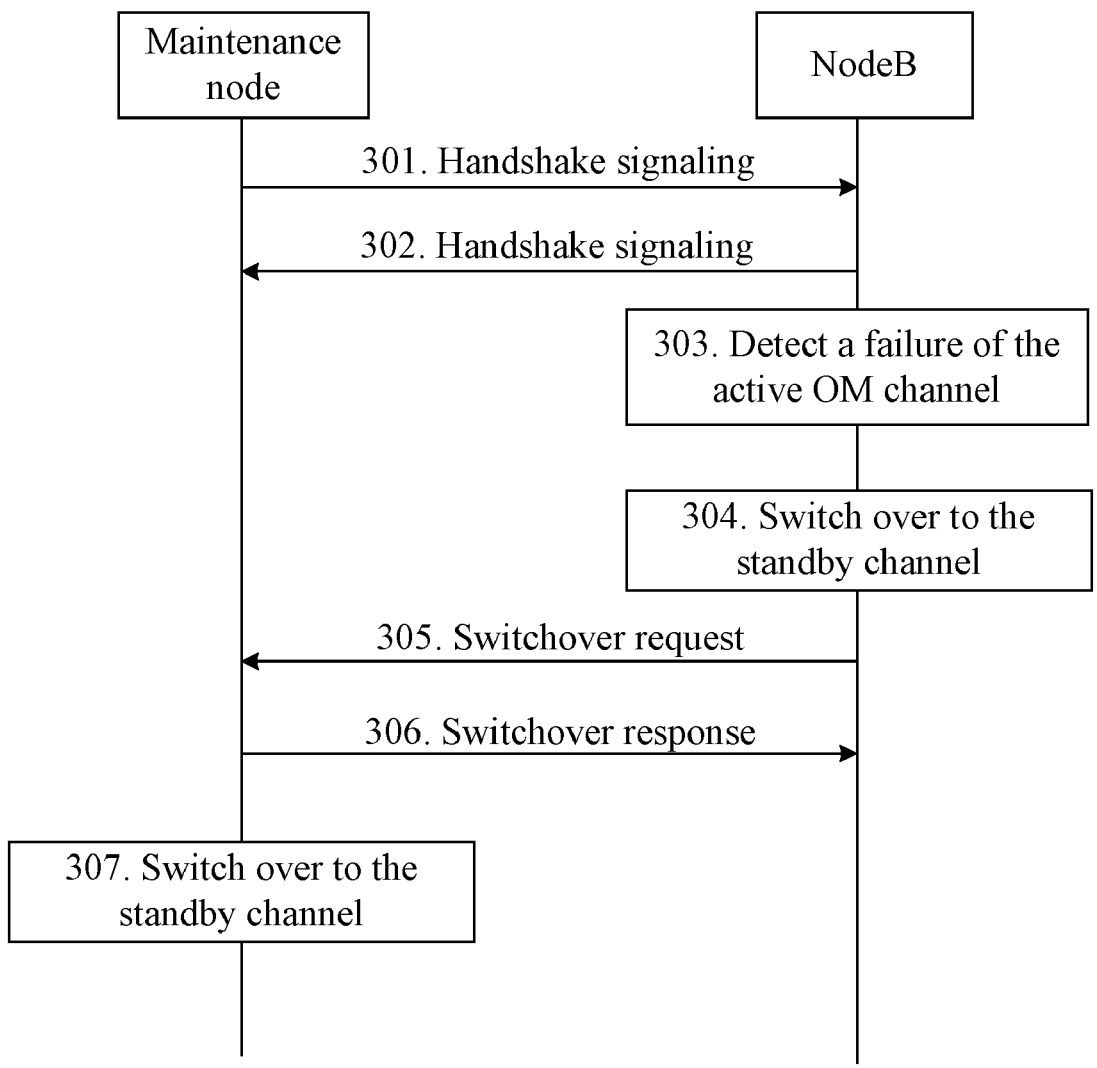
FIG. 3 shows a flowchart of a method for establishing a connection between a maintenance node and a base station according to another embodiment of the present invention.

FIG. 3 shows a method for establishing a connection between a maintenance node and a base station in one embodiment of the present invention. The method includes the following steps:

Step 301 and step 302 are the same as step 201 and step 202 in the above-mentioned embodiment.

Step 303: The base station checks whether a handshake message is received from the maintenance node within a preset period and if not, determines that the main OM channel fails.

Step 304: The base station activates the standby IP address and switches over to the standby OM channel.

Step 305: The base station sends a switchover request to the maintenance node via the activated standby OM channel. The switchover request may be carried over UDP.

Step 306: The maintenance node sends a switchover response to the base station via the standby OM channel. The switchover response may be carried over UDP.

Step 307: The maintenance node switches over to the standby OM channel and establishes a connection with the base station over the standby OM channel by using the standby IP address of the base station.

This step may be implemented in the following mode: The maintenance node uses the standby IP address of the base station to establish a connection with the base station via a TCP session with the base station over the standby OM channel.

After this step, the base station and the maintenance node exchange handshake messages over the standby OM channel to check whether the standby OM channel fails.

After step 305, step 306 is optional. This means that step 306 may be omitted and that step 307 may follow step 305 directly. In practice, to achieve a better effect, step 306 will generally be performed for confirmation.

Those skilled in the art understand that all or part of the steps in the preceding embodiments may be completed by hardware following instructions of a program. The program may be stored in a computer readable storage medium such as a Read-Only Memory (ROM), a Random Access Memory (RAM), a magnetic disk, or a compact disk.

A base station according to one embodiment of the present includes: a switchover unit, adapted to switch over to a preset standby Operation & Maintenance (OM) channel if a main OM channel fails; a notification sending unit, adapted to send a notification to a maintenance node over the standby OM channel to indicate a switchover to the standby OM channel of the base station; and a connection establishing unit, adapted to establish a connection between the base station and the maintenance node over the standby OM channel via a standby IP address of the base station after the switchover unit switches over to the standby OM channel.

The base station may further include a switchover request receiving unit, adapted to receive a switchover request sent by the maintenance node, where the switchover request is sent after a failure of the main channel is detected by the maintenance node. The switchover unit is further adapted to switch over to the preset standby OM channel after the switchover request receiving unit receives the switchover request.

Figure 4:
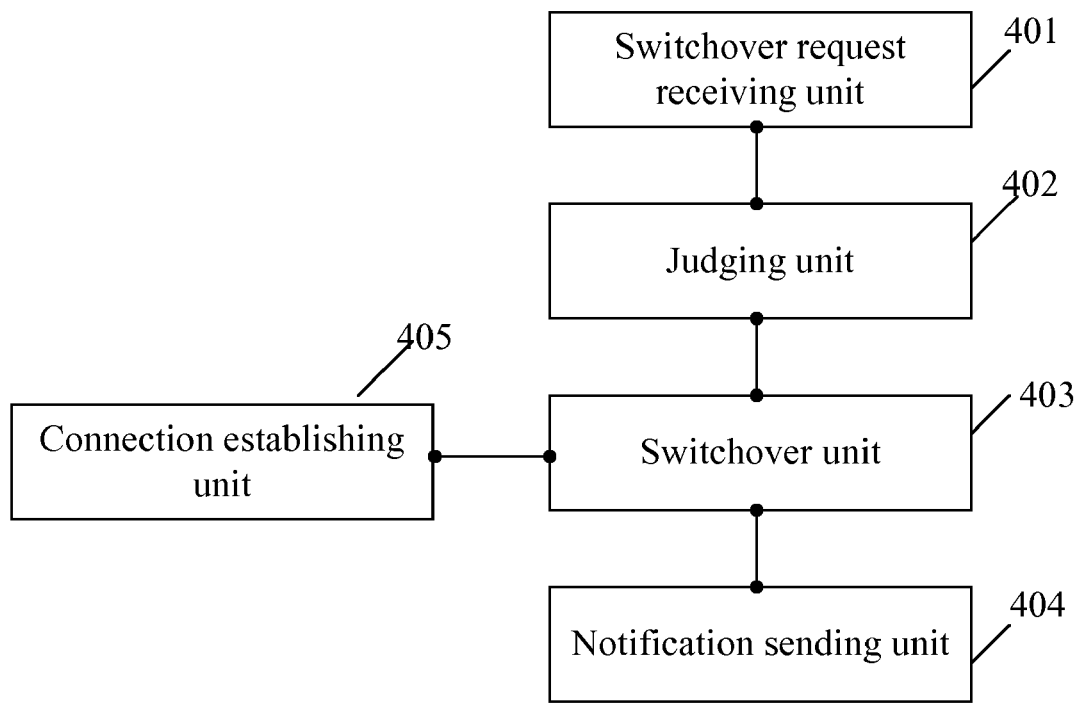
FIG. 4 shows a structure of a base station according to one embodiment of the present invention.

As shown in FIG. 4, a base station according to one embodiment of the present invention is provided and the base station includes:

a switchover request receiving unit 401, adapted to receive a switchover request sent by a maintenance node after the maintenance node detects that the main OM channel fails, where the switchover request includes a base station IP address for activation.

a judging unit 402, adapted to judge whether the base station IP address for activation is a standby IP address of the base station;

a switchover unit 403, adapted to switch over to a preset standby OM channel when the judging unit 402 determines that the base station IP address for activation is the standby IP address of the base station;

a notification sending unit 404, adapted to send to the maintenance node via the standby OM channel a notification, which may be particularly a switchover response, that the base station has switched over to the standby OM channel; and a connection establishing unit 405, adapted to establish a connection between the base station and the maintenance node over the standby OM channel by using the standby IP address after the switchover unit 403 switches over to the preset standby OM channel.

Figure 5:
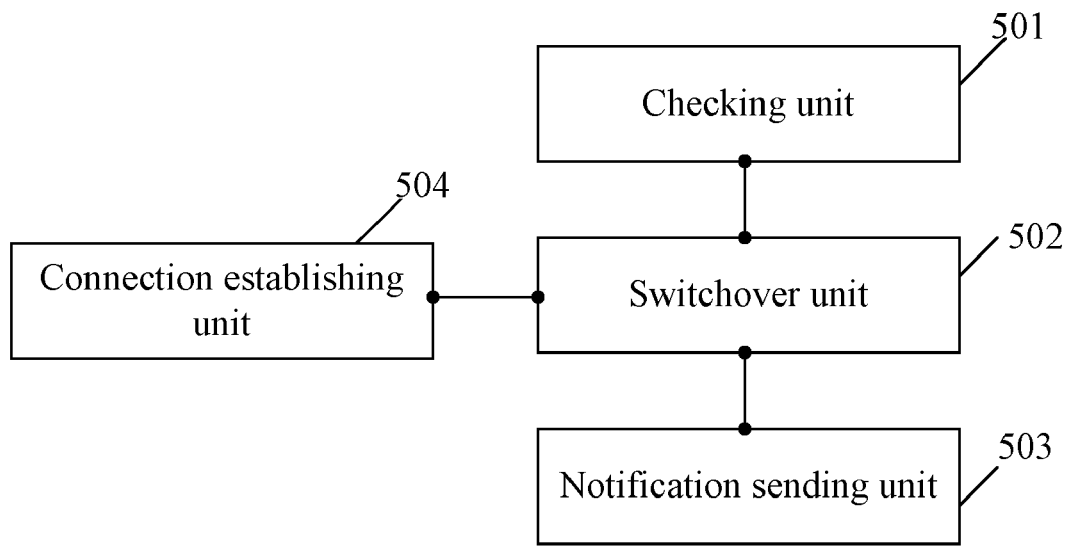
FIG. 5 shows a structure of a base station according to another embodiment of the present invention.

As shown in FIG. 5, another base station according to one embodiment of the present invention is provided and the base station includes:

a checking unit 501, adapted to check whether the main OM channel fails;

a switchover unit 502, adapted to switch over to a preset standby OM channel when the checking unit 501 detects a failure of the main OM channel;

a notification sending unit 503, adapted to send to the maintenance node via the standby OM channel a notification that the base station has switched over to the standby OM channel; and a connection establishing unit 504, adapted to establish a connection between the base station and the maintenance node over the standby OM channel by using the standby IP address after the switchover unit 502 switches over to the preset standby OM channel.

A maintenance node according to one embodiment of the present invention includes: a notification receiving unit, adapted to receive a notification from a base station indicating a switchover to a standby Operation & Maintenance (OM) channel of the base station; and a connection establishing unit, adapted to establish a connection with the base station over the standby OM via a standby IP address of the base station after the notification receiving unit receives the notification.

Figure 6:
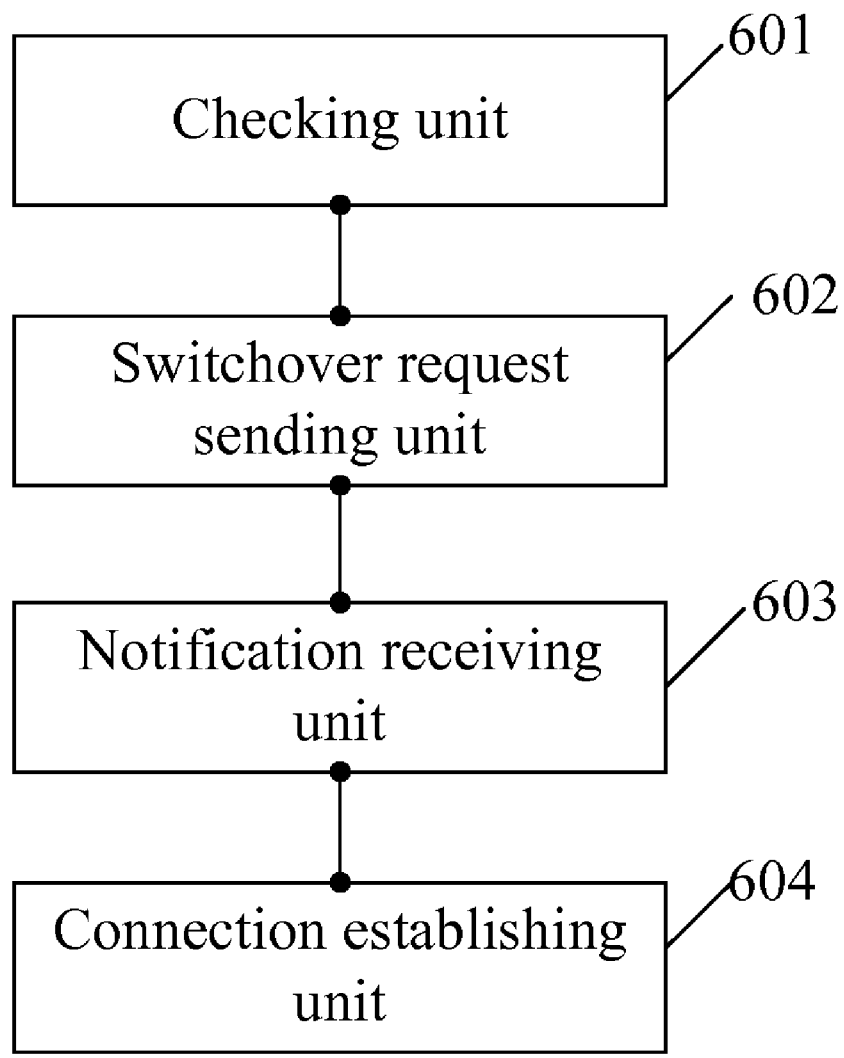
FIG. 6 shows a structure of a maintenance node according to a fifth embodiment of the present invention.

As shown in FIG. 6, a maintenance node according to one embodiment of the present invention is provided and the maintenance node includes:

a checking unit 601, adapted to check whether the main OM channel fails;

a switchover request sending unit 602, adapted to send a switchover request to the base station so as to trigger the base station to switch over to the standby OM channel when the checking unit 601 detects a failure of the main OM channel;

a notification receiving unit 603, adapted to receive from the base station a notification, which may be a switchover response, that the base station has switched over to the standby OM channel; and a connection establishing unit 604, adapted to establish a connection with the base station over the standby OM channel by using the standby IP address of the base station and switch over to the standby OM channel.

A network system according to one embodiment of the present invention includes: a base station and a maintenance node. The base station is adapted to switch over to a preset standby OM channel if a main OM channel fails, and send a notification to a maintenance node over the standby OM channel to indicate a switchover to the standby OM channel of the base station; and the maintenance node is adapted to establish a connection with the base station over the standby OM via a standby IP address of the base station after the notification is received.

One embodiment of the present invention provides a network system which at least includes a base station and a maintenance node.

The base station is adapted to: receive from the maintenance node a switchover request that carries an IP address of the base station for activation and judge whether the IP address of the base station for activation is a standby IP address of the base station, and when the IP address of the base station for activation is the standby IP address of the base station, switch over to the standby OM channel and send to the maintenance node via the standby OM channel a notification, which may be a switchover response, that the base station has switched over to the standby OM channel.

The maintenance node is adapted to: check whether the main OM channel fails, and send to the base station a switchover request that carries an IP address of the base station for activation when the main OM channel fails, so as to trigger the base station to switch over to the standby OM channel; and adapted to establish a connection with the base station over the standby OM channel by using the standby IP address of the base station, and exchange service data with the base station via the standby OM channel.

One embodiment of the present invention provides a network system which at least includes a base station and a maintenance node.

The base station is adapted to: check whether the main OM channel fails, and when the main OM channel fails, switch over to a preset standby OM channel and send to the maintenance node via the standby OM channel a notification, which may be a switchover request, that the base station has switched over to the standby OM channel.

The maintenance node is adapted to: send a switchover response to the base station after receiving the switchover request, establish a connection with the base station over the standby OM channel by using the standby IP address of the base station, and exchange service data with the base station via the standby OM channel.

The technical solution provided by the embodiments of the present invention is applicable to 3G networks but not limited to 3G networks. It may also be applicable to other network systems like Long Term Evolution (LTE) and Worldwide Interoperability for Microwave Access (WiMAX) systems.

To sum up, the embodiments of the present invention provide the following benefits:

Two OM channels, one main and the other standby, are established between a base station and a maintenance node so that, when the main OM channel fails, the base station and the maintenance node can exchange service data via the standby OM channel and that the remote maintenance of the base station by the maintenance node will not be affected.

Active-standby switchover of OM channels is implemented at the transport layer and transport layer protocols like TCP and UDP can be adopted so that it is unnecessary to know whether the bearer type is ATM or IP. This means the bearer combinations of the active and standby OM channels may be: ATM+ATM, ATM+IP, and IP+IP. Therefore, the technical solution provided by the embodiments of the present invention is independent of the transport bearer, or independent of the lower layer protocol. Because transport layer protocols TCP and UPD are adopted, the technical solution only requires the lower layer to provide an IP interface without the necessity of knowing the bearer type and the equipment in use. The technical solution is also independent of equipment.

Although the present invention has been described through several exemplary embodiments, the invention is not limited to such embodiments. It is apparent that those skilled in the art can make various modifications and variations to the invention without departing from the spirit and scope of the present invention. The invention is intended to cover the modifications and variations provided that they fall in the scope of protection defined by the following claims or their equivalents.

What is claimed is:

1. A method for establishing a connection between a maintenance node and a base station, the method comprising:
   checking, by the maintenance node, whether a main Operation & Maintenance (OM) channel fails, wherein the main OM channel is a maintenance channel between the base station and the maintenance node and is used by the maintenance node to maintain the base station remotely;
   sending, by the maintenance node, a switchover request to the base station if the main OM channel fails;
   receiving, by the maintenance node, a notification from the base station indicating a switchover to a standby OM channel after the base station switches over to the standby OM channel;
   switching over to the standby OM channel, by the maintenance node, after receiving the notification; and
   establishing, by the maintenance node, a connection with the base station over the standby OM channel via a standby IP address of the base station.

2. The method according to claim 1, wherein establish the connection with the base station over the standby OM channel via a standby IP address of the base station comprises:
   using, by the maintenance node, the standby IP address of the base station to establish a connection with the base station via a Transmission Control Protocol (TCP) session with the base station over the standby OM channel.

3. A base station, comprising:
   a switchover request receiving unit, configured to receive a switchover request sent by a maintenance node, wherein the switchover request is sent after a failure of a main Operating & Maintenance (OM) channel is detected by the maintenance node, wherein the main OM channel is a maintenance channel between the base station and the maintenance node and is used by the maintenance node to maintain the base station remotely;
   a switchover unit, configured to switch over to a standby OM channel after the switchover request receiving unit receives the switchover request;
   a notification sending unit, configured to send a notification to the maintenance node over the standby OM channel to indicate a switchover to the standby OM channel; and
   a connection establishing unit, configured to establish a connection with the maintenance node over the standby OM channel via a standby IP address of the base station after the maintenance node switches over to the standby OM channel.

4. The base station according to claim 3, wherein the base station further comprises:
   a judging unit, configured to judge whether a target IP address for activation carried in the switchover request is the standby IP address of the base station;
   wherein the switchover unit is further configured to switch over to the standby OM channel if the target IP address for activation is the standby IP address of the base station.

5. A maintenance node, comprising:
   a checking unit, configured to check whether a main Operation & Maintenance (OM) channel has failed, wherein the main OM channel is a maintenance channel between a base station and the maintenance node and is used by the maintenance node to maintain the base station remotely;
   a switchover request a sending unit, configured to send a switchover request to the base station for the switchover to a standby OM channel, if the checking unit detects a failure of the main OM channel;

a notification receiving unit, configured to receive a notification from the base station indicating a switchover to the standby OM channel;

a switchover unit, configured to switch over to the standby OM channel, after the notification receiving unit receives the notification; and a connection establishing unit, configured to establish a connection with the base station over the standby OM via s standby IP address of the base station.

6. A network system, comprising:

a base station; and a maintenance node, wherein the maintenance node is configured to check whether a main Operation & Maintenance (OM) channel has failed and to send a switchover request to the base station for switchover to a standby OM channel if the main OM channel fails, wherein the OM channel is a maintenance channel between the base station and the maintenance node and is used by the maintenance node to maintain the base station remotely;

wherein the base station is configured to switch over to the standby OM channel if the main OM channel fails and to send a notification to the maintenance node over the standby OM channel to indicate a switchover to the standby OM channel; and wherein the maintenance node is further configured to receive the notification from the base station, to switch over to the standby OM channel after receiving the notification, and to establish a connection with the base station over the standby OM via a standby IP address of the base station.

7. The network system according to the claim 6, wherein the base station is further adapted to determine whether a target IP address for activation carried in the switchover request is the standby IP address of the base station, and switch over to the standby OM channel if the target IP address is the standby IP address of the base station.

8. A method for establishing a connection between a maintenance node and a base station, the method comprising:

receiving, by the base station, a switchover request sent by the maintenance node, wherein the switchover request is sent after a failure of a main Operation & Maintenance (OM) channel is detected by the maintenance node, wherein the main OM channel is a maintenance channel between the base station and the maintenance node and is used by the maintenance node to maintain the base station remotely;

switching over to a standby OM channel, by the base station, after receiving the switchover request from the maintenance node;

sending, by the base station, a notification to the maintenance node over the standby OM channel to indicate a switchover to the standby OM channel; and establishing, by the base station, a connection with the maintenance node over the standby OM channel via a standby IP address of the base station after the maintenance node receives the notification and switches over to the standby OM channel.

9. The method according to claim 8, wherein before sending a notification to a maintenance node, the method further comprises;

activating, by the base station, the standby IP address of the base station.

\* \* \* \* \*